350-96.23 SR

6/14/83 XR 4,388,485

United States Patent [19]

Zeidler et al.

[11] 4,388,485

[45] Jun. 14, 1983

[54] LONGITUDINALLY WATER-TIGHT CABLES

[75] Inventors: Guenter Zeidler, Germering; Ernst Ney, Krailling; Gerhard Lange; Helmut Saller, both of Munich, all of Fed. Rep. of Germany

[73] Assignee: Siemens Aktiengesellschaft, Berlin & Munich, Fed. Rep. of Germany

[21] Appl. No.: 247,078

[22] Filed: Mar. 24, 1981

[30] Foreign Application Priority Data

Mar. 28, 1980 [DE] Fed. Rep. of Germany ....... 3012206

[51] Int. Cl.[3] ........................ B32B 9/00; B32B 15/00; G02B 5/16; H02G 15/20

[52] U.S. Cl. ................................ 174/23 C; 350/96.23; 428/376; 428/383; 428/384; 428/389; 428/398

[58] Field of Search ............... 428/376, 384, 387, 389, 428/375, 379, 398; 174/110 S, 110 F, 110 SR, 110 R, 110 B, 23 R, 23 C; 156/48

[56] References Cited

U.S. PATENT DOCUMENTS

| | | | |
|---|---|---|---|
| 1,524,124 | 1/1925 | Fisher et al. | 174/23 C |
| 3,347,974 | 10/1967 | Arendt et al. | 156/48 |
| 3,576,388 | 4/1971 | Bruns | 174/110 F |
| 3,803,339 | 4/1974 | Speckman | 174/23 C |
| 3,875,323 | 4/1975 | Bopp et al. | 174/23 C |
| 3,893,961 | 7/1975 | Walton et al. | 174/23 C X |
| 3,961,128 | 6/1976 | Beach | 174/23 C |
| 4,110,137 | 8/1978 | Beach | 174/23 C X |

FOREIGN PATENT DOCUMENTS

| | | | |
|---|---|---|---|
| 2018863 | 10/1971 | Fed. Rep. of Germany | 174/23 C |
| 2243615 | 3/1974 | Fed. Rep. of Germany | 174/23 C |
| 2716524 | 10/1978 | Fed. Rep. of Germany | . |

*Primary Examiner*—Lorraine T. Kendell

*Attorney, Agent, or Firm*—Hill, Van Santen, Steadman, Chiara & Simpson

[57] ABSTRACT

Longitudinally water-tight cables, such as communication cables, are produced so that the interior of such cables have a filling material containing a water-repellant substance and relatively small diameter gas bubbles embedded in the filling material. The filling material is thickened with a reticulating thixotropic substance having a 3-dimensional network-like structure which is disruptable under mechanical influence and is regenerable over a time span in a motionless state with a significant increase of viscosity. The size of the gas bubbles are adjusted relative to the resistance to disruption of the network-like structure so that the buoyancy of such gas bubbles is significantly below such resistance to disruption in the motionless state of the filling material whereby such gas bubbles are maintained in their respective positions within the filling material in a time-stable manner during a motionless state.

6 Claims, 3 Drawing Figures

LONGITUDINALLY WATER-TIGHT CABLES

BACKGROUND OF THE INVENTION

1. Field of the Invention

The invention relates to longitudinally water-tight cables and somewhat more particularly to communication cables having in their interior a filling material containing a water-repellant substance and relatively small gas bubbles embedded therein.

2. Prior Art

Longitudinally water-tight cables having in their interior a filling material containing a water-repellant substance and relatively small gas bubbles embedded therein is known from German Offenlegungsschrift 27 16 524. However, the emplacement of the small gas bubbles in such filling material within these cables is such that their position in the filling material is not stable without further ado and there is a danger that larger gas bubbles (which have an unfavorable influence on electrical properties of a cable) form at specific locations because of the migration and subsequent coupling of the smaller gas bubbles into a larger gas bubble. To avoid this drawback the prior art attempted to stabilize the respective gas bubble positions by providing supportive components, in the form of fibers, within the filling material.

However, the preparation of such added fibers and their subsequent incorporation into water-repellant filling material requires an additional outlay. Further, the desired effect of such fibers is only assured when the fiber size is approximately of the same magnitude as the size of the small gas bubbles. Fibers which are too large disrupt the electrical properties of a cable in an undesirable manner so that a very fine division of the additional fiber components become necessary.

SUMMARY OF THE INVENTION

The invention provides an improved cable structure of the type earlier described which includes at least one signal-carrying element embedded in a filing material and a jacket for closing-off the interior of such structure from the outside but which is simpler to manufacture and whose filling material and incorporated small gass bubbles, which are distributed substantially uniformly throughout the filling material, are homogeneous per se and the gas bubbles are sufficiently secured against separation or displacement from their respective positions within such filling material.

In accordance with the principles of the invention, the cable filling material is thickened with a reticulating thixotropic substance characterized by a 3-dimensional network-like structure which is disruptable upon application of a mechanical force and is regenerable over a time span in a motionless state, with a significant increase in viscosity. Further, the size of the relatively small gas bubbles is adjusted or controlled relative to the resistance to disruption or tearing of the network-like structure of the thixotropic substance, such that the buoyancy of the small gas bubbles in the static or motionless state of the filling material is significantly below this resistance to disruption whereby such small gas bubbles, at least during a motionless state, are maintained time-stable in their respective positions within the filling material.

A cable constructed in accordance with the principles of the invention is advantageous in that the filling material can be maintained very homogeneous per se because the reticulating thixotropic substance and the water-repellant substance, together with the incorporated small gas bubbles can be intimately mixed with one another and in usage a separation does not occur. This particularly applies to the small gas bubbles because these are retained in the reticular structure of the thixotropic substance in such a manner that migration due to buoyancy forces is no longer possible in the static or motionless state.

It is of particular advantage that this condition of a stable inclusion of small gas bubbles in the filling material can be assured solely by controlling the size of the gas bubbles since it is only their size which determines the buoyancy thereof and their tendency to migrate. It is of particular significance in this context that the diameters required of the gas bubbles for a stable, spatial inclusion thereof in the filling material are relatively small so that a very large number of very small gas bubbles can be embedded in the filling material. This produces particularly favorable electrical properties and, moreover, a particularly large volume of gas within the filling material. Such large gas volume produces a relatively large weight reduction in the resultant cable and particularly good electrical properties in such cable.

All such substances which form spatial networks (skeletons) due to agglomeration on the basis of relatively weak, i.e., non-chemical bonds can be employed as the reticulating thixotropic substance in the practice of the invention. Accordingly, substances in which dipole interactions and/or van der Waals forces are effective for the reticulating cohesion of the individual basic components can be employed. Such forces suffice in order to assure a sufficiently stable cohesion of the arising reticular structures for the small gas bubbles up to a certain size. Exemplary substances which can be used in this context include finely divided carbon (graphite) particles and non-annealed $Al_2O_3$ particles.

DESCRIPTION OF PREFERRED EMBODIMENTS

The principles of the invention apply to both optical communication cables, whose signal-carrying elements comprise optical fibers, and electrical communication cables, whose signal-carrying elements comprise electrical conductors, wherein the interior of such cables is provided with a filling material containing a water-repellant substance and relatively small-diamater gas bubbles uniformly intermixed and embedded in such filling material.

The filling material is thickened with a reticulating thixotropic substance characterized by a 3-dimensional network-like structure which is disruptable under mechanical influence and is regenerable over a time span in a motionless state, with a significant increase of viscosity.

A particularly advantageous embodiment of the invention, both from a point of view of the electrical properties of the cable as well as from a point of view of the processing technology, consists in forming the 3-dimensional network-like structure of the thixotropic substance by so-called hydrogen bridges. Such hydrogen bridges can be formed by substances containing a radical selected from the group consisting of NH, SH, and a halogen H. Further, such 3-dimensional network-like structure can be formed by OH groups in the thixotropic substance and/or by silanol groups in the thixotropic substance.

Figure 1:
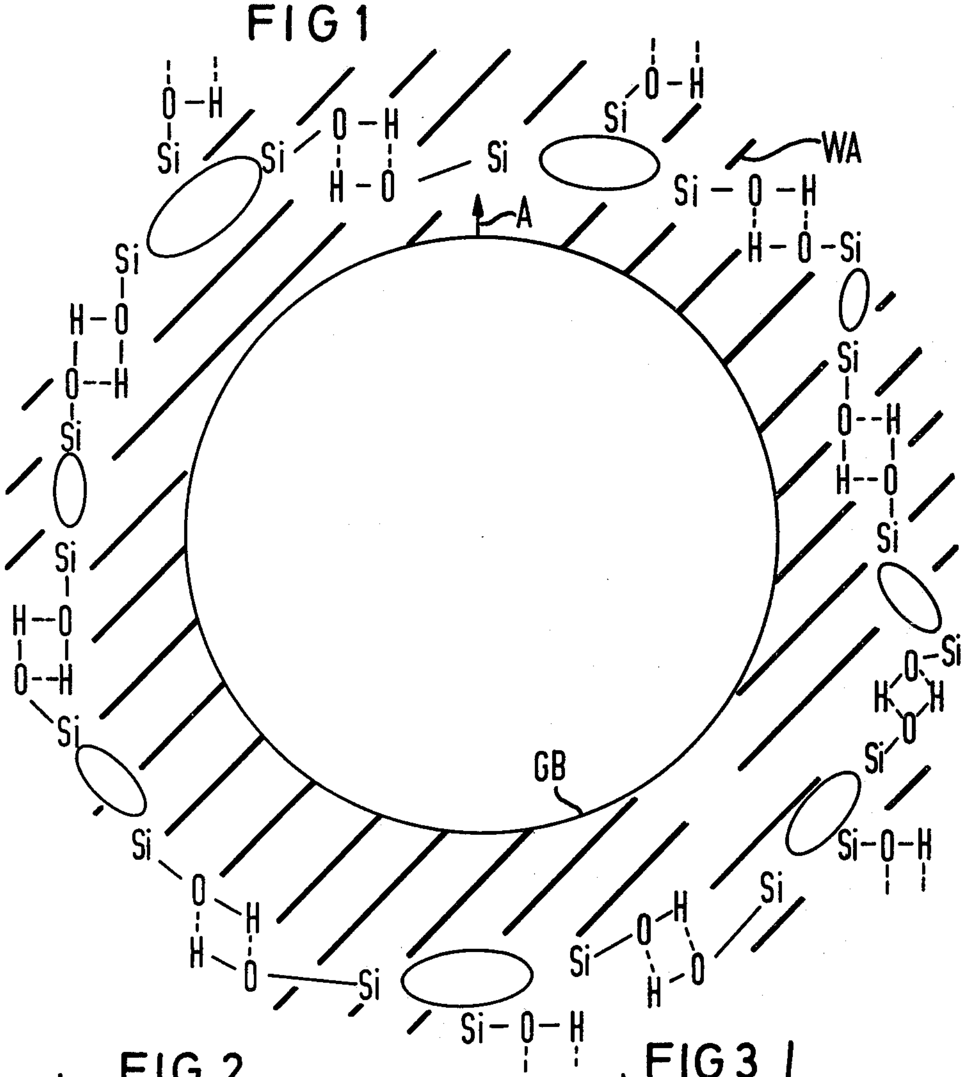
FIG. 1 is a schematic highly enlarged illustration of a spatial network-like structure of a thixotropic substance utilized in the practice of the invention.

A preferred example of a suitable thixotropic substance useful in the practice of the invention is finely divided amorphous silicic acid. This substance can be attained in an extremely pure form by means, for example, of hydrolysis of silicon tetrachloride in an oxy-hydrogen gas flame wherefrom it is produced in relatively uniform spherical particles. Such spherical particles have diameters in the magnitude of a few μm and contain silanol radicals at their surfaces, as illustrated in FIG. 1 (i.e., SiOH−). Such radicals are designated as silanol groups i.e., silicon atoms having OH groups attached. With the assistance of such silanol groups, the individual basic elements are linked into a 3-dimensional network-like structure as a result of the linkage forces between the oxygen and hydrogen atoms, schematically illustrated with broken lines in FIG. 1. Such 3-dimensional network is converted into a closed gel structure, given a sufficiently high concentration. The illustrated small gas bubble, GB, can be shut-in within such gel structure, whose network-like structure is schematically illustrated in FIG. 1, and the schematically indicated buoyancy force A (top of bubble GB) of such a small gas bubble must remain significantly smaller than the force which, due to the network-like structure, exists between the individual basic components (here as a result of the OH bond) if a migration of such gas bubble GB is to be prevented over a given time span.

An excess of additives having highly polar molecules disturbs the formation of the skeleton or network-like structure effecting the thixolability in the filling material. Therefore, in the practice of the invention, primarily saturated aliphatic oils without polar side groups or end groups (ester groups, acid groups, etc.) are employed as the water-repellant substances. For the same reason, the filling material should be as free as possible of halogen hydrocarbon compounds, nitrogen hydrocarbon compounds and mixtures thereof.

The force of buoyancy depends on the diameter of a given gas bubble. The buoyancy force A, thus, can be regulated in a particularly simple manner by the selection and control of the size of the small gas bubbles in such a manner that the network-like structure cannot be torn or distrupted by such buoyancy force A. Further, the largest admixable bubble size for a given material can be simply determined by preparing suitable samples with gas bubbles varying in size and observationally determining below which diameter size no bubble migration occurs.

However, when greater shearing strains occur, as by the application of mechanical forces on a cable, a destruction of the network-like structure, schematically illustrated at FIG. 1, does occur so that the only force still opposing the buoyancy force A of the gas bubble GB is the tenacity of the water-repellant substance WA (indicated by shading), which is also present in the filling material. In cables, however, it must be remembered that such shearing strains normally occur only briefly, for example, during a bending operation in laying the cable and a static or motionless state then exists over extremely prolonged time spans. The thixotropic substances, particularly the exemplary silicic acid, have the property that the spatial or 3-dimensional network-like structures are again formed or regenerated in the static state with a significant increase of viscosity after release or cessation of such a mechanical strain and, thereafter, the undesired migratory movement of gas bubbles can be prevented in the subsequent motionless state. During the transition time period, the gas bubbles are sufficiently retained in their respective positions due to the decelarating effect of the water-repellant substance. Accordingly, the water-repellant substance must be not be too liquid. A sufficiently high viscosity is attained by the use of a mixture of saturated liquid and solid hydrocarbons, such as a hard parafin, wax and relatively high molecular weight oil fractions. Additions of components which promote stickiness (atactic polypropylene, polyisobutylene, etc.,) can also be admixed in the filling material so as to sufficiently stabilize the foam-like filling material during the unavoidable movement phases of a cable.

Correspondingly high viscosity (i.e., having a pasty consistency) is also, for example, achieved by incorporating particles which are crystlline per se (low-molecular weight polyethylene components or interconnected (rubber-elastic components) particle into the filling material.

In achieving suitable filling materials, it is to be taken into consideration that, on the one hand, the time constant during which the network-like structure is regenerated must be selected relative to the possible migration rate of the gas bubbles, GB, given a disrupted network-like structure, in such a manner that the migration motions (advantageously less than 1 mm per 30 years) can be maintained within admissible limits during the time in which mechanical movements have caused a disruption of the network-like structure. This is attained by proper selection of corresponding viscosity values for the filling material.

When a water-repellant substance, WA, in the filling material is comprised of oily components with viscosities up to approximately 10,000 cP, then such time constant for regenerating the 3-dimensional network-like structure within the thixotropic substance ranges from seconds to minutes, whereas for more viscous components, with, for example, higher wax amounts, and having viscosities above 10,000 cP, such time constant ranges from minutes to hours.

The thixotropic substance, i.e., preferably the finely distributed thixotropic silicic acid, is preferably incorporated into a water-repellant substance as an additive in an amount up to about 20% and more preferably in an amount ranging between about 2 and 6% by weight, based on a 100% basis of the filling material. As indicated hereinabove, such water repellant substances preferably comprise a mixture of saturated liquid and solid hydrocarbons, such as, for example, select oil fractions and hard parafin.

In general, it can be stated that the water-repellant substance must be characterized by its lack of interference to the formation of the 3-dimensional network-like structure in the thixotropic substance and/or by a compatibility with an existing 3-dimensional network structures. For example, the presence of water is particularly undesirable for the formation of such 3-dimensional network-like structures in conjunction with amorphous silicic acid, because the silanol groups thereof are hydrophylic and therefore, loose their property for agglomeration due to too great of a water concentration. Since, however, the substances utilized in cables for filling materials are already substantially water-repellant so as to prevent the penetration of water into a cable when damage to a cable jacket occurs, this feature at the same time guarantees that the 3-dimensional network-like structures cannot be destroyed to a greater extent due to added water. In this context, the water-repellant substance WA has a double function, since it both protects the cable per se from the penetration of water and at the same time, also maintains the capability of the thixotropic substance to form the necessary 3-dimensional network-like structures.

However, it is also possible, for example, to negate the effect of the silanol groups by conversion with silicon-organic compounds (for example, dimethyldichlorosilane). In this manner, a hydrophobic silicic acid is attained, with which even the addition of water would no longer effect an overly large disruption. However, this means an additional outlay and the necessary protective function can more economically be provided by the water-repellant substance within the filling compound.

During the manufacture of a cable, care must be taken that the gas bubbles, preferably consisting of nitrogen or Freon (a registered trademark for a group of halogenated hydrocarbon gases) are substantially uniformly distributed within the filling material and exist below a given size so that the filling material has a consistency which is somewhat foam-like overall.

Gas bubbles can be incorporated into the filling material in a number of ways. In one embodiment, the select gas is injected into the filling material, which consists of a water-repellant substance and an added thixotropic substance, under pressure from an outside source via suitable nozzles or the like. Thereafter, during an appropriate mixing operation (generally under pressure) a substantially homogeneous distribution of very small, compressed gas bubble throughout the filling material occurs. During subsequent charging of this mixture into the interior of a cable, the filling material is injected via appropriate funnels or the like and into the interior of a cable having signal-carrying elements therein and which is closed-off toward the outside by the cable sheath or jacket. Subsequently, the gas bubbles expand to their final, still relatively small size because of the decreased pressure that exists within a finished cable.

Another means of incorporating gas bubbles is by adding compounds to the filling material which split-off a gas when heated. In this embodiment, the filling compound need only be subsequently (i.e., after mixing with such a compound) briefly heated, for example, during a cable manufacturing process and a great number and, due to nucleators, very small gas bubbles are generated in a sufficient manner. Further, given an appropriately thorough mixing, it is assured that the gas bubbles are uniformly distributed throughout the entire filling material whereby the size of the gas bubbles is influenced or controlled by the pore size of the added material which splits-off the gas, by the temperature rise (or energy input) and by control of applied pressure.

The gas bubble formation during the manufacture of the foam-like filling material of the invention is advantageously increased by admixing a small amount of nucleators (dispersed polyethylene, fluoropolymer or mineral particles) into the filling material.

Another means of generating the desired small gas bubble is to dissolve a gas in the water-repellant substance mixed with a thixotropic substance, with the application of a suitably high pressure. During the further cable manufacturing processes, this pressure is then reduced so that the boiling point decreases and gas bubbles having very small diameters and which are very finely distributed throughout the filling material are generated.

The filling materials utilized in the practice of the invention must have a sufficiently high specific electrical resistance, which, for example, at 20° C. is above about $10^{13}$ Ωcm and at 100° C. still is above about $3\cdot10^{10}$ Ωcm.

Under certain conditions when damage to the cable jacket occurs, water can penetrate therein which, depending on the nature of the ground, can be slightly acidic or slightly alkaline, so that special measures must be taken in order to prevent an injurious effect in such instances. This is achieved in insuring that the filling material, without the thixotropic substance, is characterized by a certain minimum viscosity (preferably above about 1000 cP) in a temperature range extending from about 0° C. through 20° C. Further, the filling material should contain no or substantially no water-soluble or hydrophilic components or hydrophilic molecular groups (i.e., OH, COOH, $NH_2$, etc) and must be substantially non-wettable with water.

Figure 2:
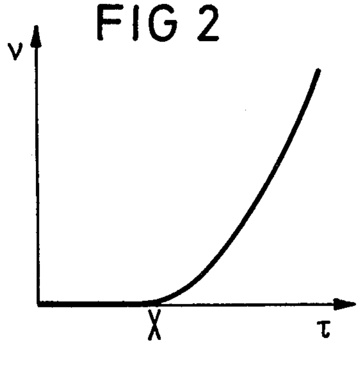
FIG. 2 is a diagrammatic illustration showing the relation between shear strain as a function of shear rate for a given thixotropic substance utilized in the practice of the invention.

Referring now to FIG. 2, the shear rate $\upsilon$ is schematically illustrated for a given thixotropic substance as a function of the shear strain $\tau$. Up to point X of the shearing strain, the deflection thereof remains relatively time-stable, i.e., the 3-dimensional network-like structure is not disrupted or torn. As shown, the 3-dimensional network-like structure begins disrupting above point X, so that, in the motionless state, the thixotropic agent, together with the enclosed gas bubbles must lie sufficiently below point X.

Figure 3:
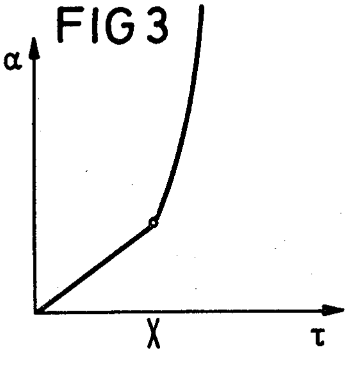
FIG. 3 is a diagrammatic illustration showing the relation between a deflection angle as a function of the shear strain for a given thixotropic substance useful in the practice of the invention.

In FIG. 3, the deflection angle, $\alpha$, is shown as a function of the shear strain $\tau$. Here too, the change of behaviour is clearly illustrated at point X.

In addition to the earlier mentioned thixotropic substances, i.e., pure silicic acid, mineral silicic acid derivatives, for example, montmorillonite, kaolin and asbestos can also be utilized as thixotropic agents in the practice of the invention.

Further, in addition to silicic acid, other substances which exhibit the property of agglomeration due to the formation of hydrogen bridges are known and these can be utilized in the practice of the invention. Preferred materials of this type are oxides selected from the group consisting of $B_2O_3$, $P_2O_5$, $GeO_2$, which are compounded with water to form suitable thixotropic agents in the practice of the invention.

Hydrogen bridges are not only formed between OH-containing compounds but can also form between compounds containing radicals selected from the group consisting of NH, SH, and/or a halogen H. Such bonds, however, are somewhat weaker than bonds linked via oxygen.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim:

1. In a longitudinally water-tight communication cable structure having at least one signal-carrying element therein and a jacket for closing the interior of such structure off from the outside and having in its interior a filling material containing a water-repellent substance and relatively small-diameter gas bubbles embedded in such filling material, the improvement wherein:

said filling material contains a reticulating thixotropic substance characterized by a 3-dimensional network-like structure formed by hydrogen bridges and which is disruptable under mechanical influence and is regenerable over a time span in a motionless state, with a significant increase of viscosity, said thixotropic substance being an oxide selected from the group consisting of $B_2O_3$, $P_2O_5$ and $GeO_2$, and being compounded with water; and said gas bubbles being of a size relative to the resistance to disruption of said network-like structure so that the buoyancy of such gas bubbles in said filling material is significantly below the resistance to disruption in the motionless state of the filling material so that such relatively small diameter gas bubbles are maintained at their respective positions in said filling material in a time-stable manner during a motionless state.

2. In a cable as defined in claim 1 wherein said water-repellant substance is characterized by a viscosity which substantially prevents said gas bubbles from effectuating an inadmissably large migration movement during those time spans when the network-like structure of said thixotropic substance is disrupted.

3. In a cable as defined in claim 2 wherein migration movements of said gas bubbles are maintained below about 1 mm per 30 years.

4. In a cable as defined in claim 1 wherein said filling material has a specific electrical resistance at 20° C. above about $10^{13}$ Ωcm and at 100° C. above about $3 \cdot 10^{10}$ Ωcm.

5. In a cable as defined in claim 1 wherein said thixotropic substance is present in said filling material in an amount equal to about 20% by weight, based on a 100% weight basis of said filling material.

6. In a cable as defined in claim 5 wherein said amount of thixotropic substance in said filling material ranges between about 2 to 6% by weight, based on a 100% weight basis of said filling material.

* * * * *